United States Patent [19]

Johnson et al.

[11] Patent Number: 4,822,234

[45] Date of Patent: Apr. 18, 1989

[54] PLATE FEED APPARATUS

[75] Inventors: Peter E. Johnson; David A. Johnson, both of Corvallis; George W. Kahl, Albany, all of Oreg.

[73] Assignee: Tekmax Inc., Tangent, Oreg.

[21] Appl. No.: 121,422

[22] Filed: Nov. 16, 1987

[51] Int. Cl.$^4$ ............................................. B65H 3/08
[52] U.S. Cl. ......................... 414/798.9; 271/31.1; 271/96; 271/103; 414/737
[58] Field of Search ................ 271/31.1, 95, 96, 103; 414/330, 737

[56] References Cited

U.S. PATENT DOCUMENTS

| | | | |
|---|---|---|---|
| 2,915,308 | 12/1959 | Matzen | 271/95 X |
| 3,155,386 | 11/1964 | Burleigh | 271/103 |
| 3,185,472 | 5/1965 | Rubow | 271/95 X |
| 3,372,924 | 3/1968 | Treff | 271/96 |
| 3,386,558 | 6/1968 | Benatar | 271/95 X |
| 3,599,541 | 8/1971 | Allen | 271/95 X |
| 3,718,328 | 2/1973 | Comstock | 271/95 X |
| 4,482,145 | 11/1984 | Feldkämper | 271/95 |
| 4,717,138 | 1/1988 | Watkiss | 271/103 |

*Primary Examiner*—Robert J. Spar
*Assistant Examiner*—Janice Krizek
*Attorney, Agent, or Firm*—Chernoff, Vilhauer, McClung & Stenzel

[57] ABSTRACT

The present invention comprises a rotary carrier which carries a plurality of semi-spherical gripping heads having concave gripping surfaces. The gripping heads are positioned such that the gripping surfaces become flush with the forwardmost plate in a vertically arrayed stack of plates as the carrier rotates. Each gripping head is mounted to the carrier through a hollow bellows and vacuum air drawn into a hole in the gripping face passes through the bellows. When the vacuum increases, due to the forwardmost plate in the stack being pulled up against the gripping head, the bellows collapses and pulls the forwardmost plate away from the stack. Rollers, which extend beyond the periphery of the carrier, urge the stack away from the gripping head immediately before they become aligned. The vacuum then pulls the forwardmost plate away from the stack and into contact with the gripping head before the bellows collapses thereby increasing the gap between them. Vacuum is provided to the gripping head through a passageway which opens out of an opening in the carrier. A first sector plate, which is journaled on the carrier axle but does not rotate with the carrier, has a slot passing through it which overlies the opening in the carrier when they are aligned. A second sector plate, which overlies and is attached to the first sector plate, has a hole in it which opens into the slot in the first sector plate. A vacuum tube extends between this opening and a vacuum source.

6 Claims, 3 Drawing Sheets

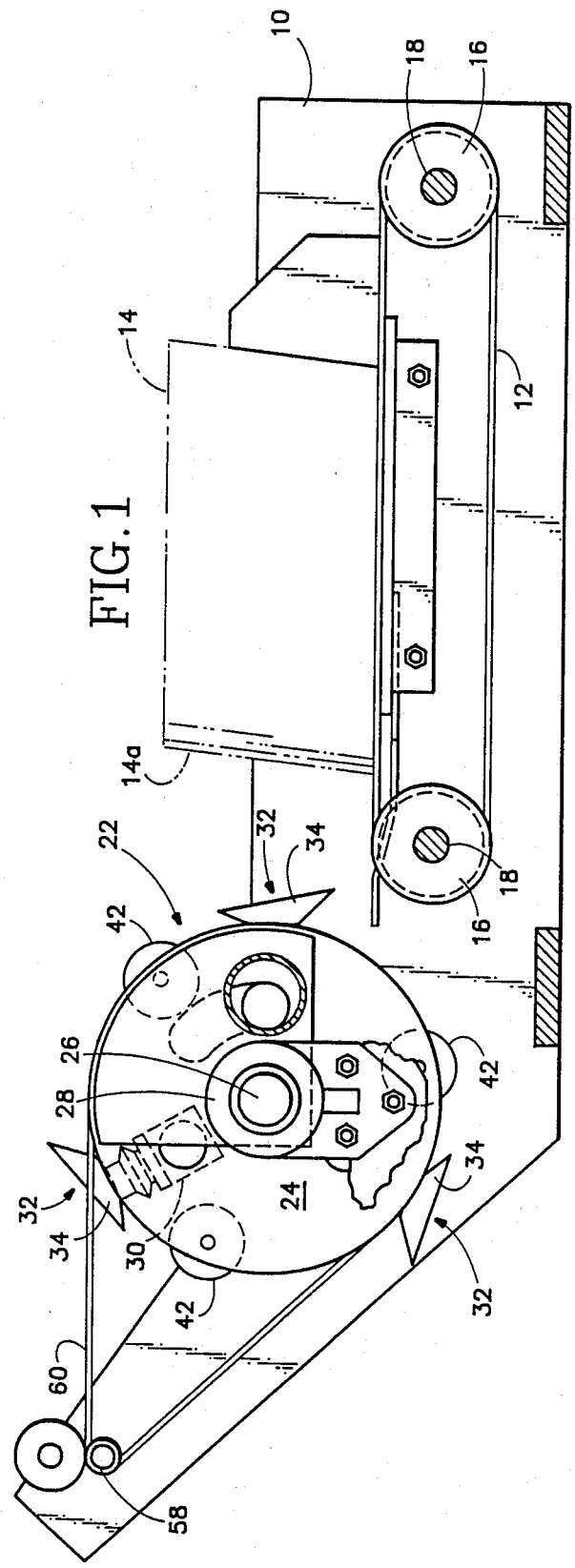
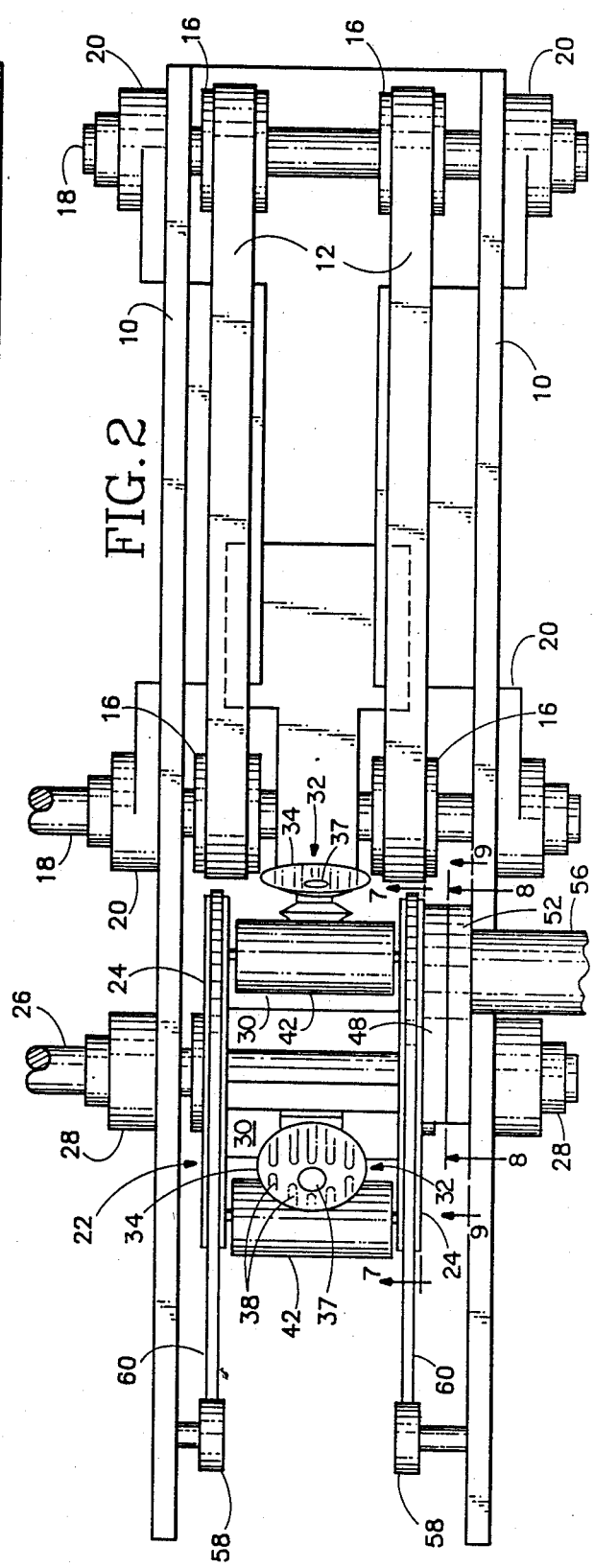
FIG. 1
FIG. 2

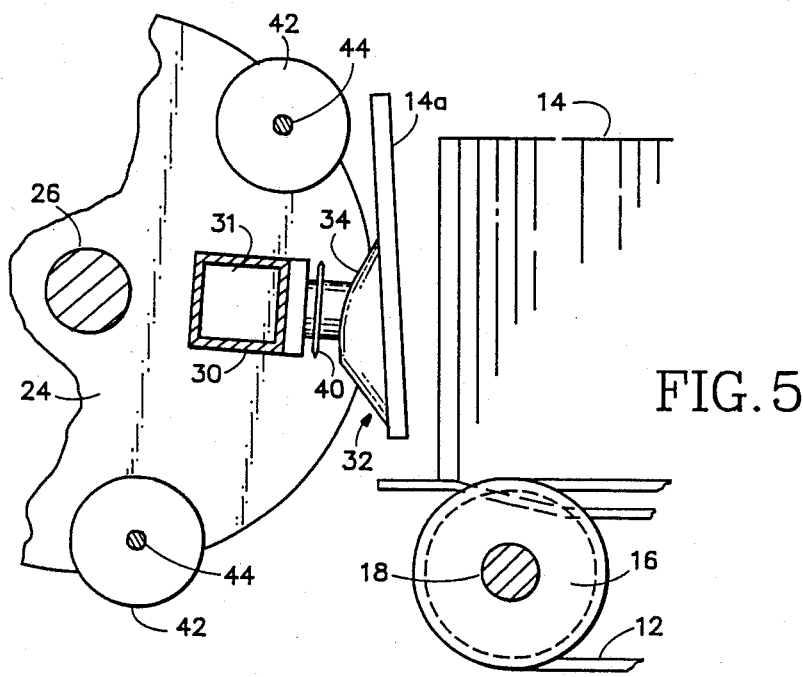
FIG. 5
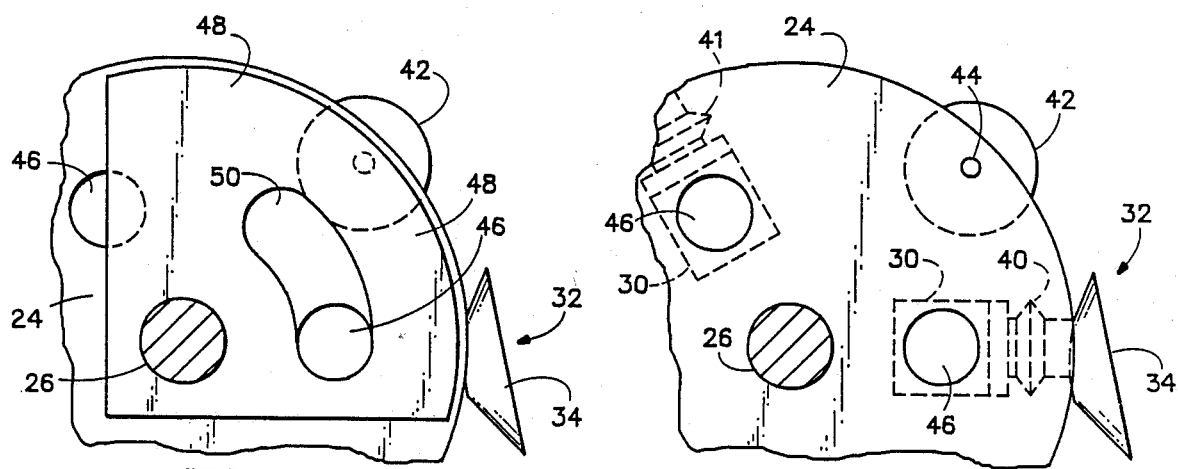
FIG. 8
FIG. 7
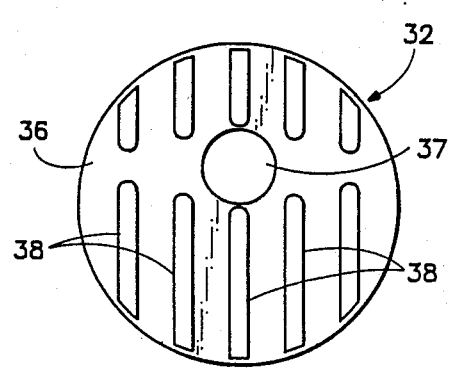
FIG. 6

PLATE FEED APPARATUS

BACKGROUND AND SUMMARY OF THE INVENTION

This invention relates to an apparatus for removing plates from a stack of plates one at a time and depositing them at another location for further processing, and in particular to the gripping head and vacuum supply system associated with such an apparatus.

In many industrial applications it is necessary to remove plates from a stack of plates one at a time and deposit them serially at a remote location for further processing. With rigid plates, such as the lead plates used in storage batteries, it is necessary to separate each plate from the stack before starting to move it away from the stack. This is because the apparatus typically used for moving the plates is a rotary carrier, and as a plate is rotated with the carrier its lower edge strikes the remaining plates in the stack unless it first is separated from the stack. In many applications this separation can be accomplished with a feed apparatus such as shown in U.S. Pat. No. 4,462,745. However, in two situations this prior art device does not function adequately.

First, the apparatus shown in U.S. Pat. No. 4,462,745 uses vacuum alone to pull the forwardmost plate away from the remaining plates in the stack. However, the plates used on large batteries are quite heavy and it may not be possible to generate enough force with vacuum to pull them far enough away from the stack.

Secondly, the apparatus shown in U.S. Pat. No. 4,462,745 utilizes a solenoid valve to initiate vacuum flow to the pick-up head when the head is aligned with the stack and to terminate vacuum flow when it is time to disengage the plate. While solenoid valves are expensive and require periodic maintenance to operate well, they are satisfactory in the single head machine disclosed in the above-referenced prior art patent. However, single head machines are speed limited, since it is not possible to keep a plate adhered to a carrier which is rotating at a high rate of speed. Therefore, in order to increase the feed rate of this type of carrier it is necessary to use multiple heads and when this occurs solenoid valves become overly expensive and troublesome. In addition, use of solenoid valves for machines with high feed rates presents timing problems which increase the cost of the machine and reduce its dependability.

The present invention overcomes the foregoing shortcomings and limitations of the prior art plate feed apparatus by providing a rotary carrier which is comprised of a spaced-apart pair of cylindrical carrier plates which rotate together as a unit on a common axle. Extending between the carrier plates, at three equally-spaced radial locations, are hollow rectangular mounting blocks. Mounted on each of the mounting blocks is a gripping head which is semi-spherical and has a concave gripping surface which faces outwardly from the periphery of the carrier plates. The gripping face has a plurality of ribs extending from it to prevent bending of the plates being held on it. The gripping head is oriented such that it is flush with the forwardmost plate in the stack when it becomes aligned with it. The gripping head is attached to the mounting block through a hollow bellows, and a hole located in the gripping head fluidly interconnects through the bellows with the passageway located in the mounting block.

The gripping head is made from a firm synthetic rubber material and thus is deflectable. However, the gripping head is nonsymmetrical about the hole located in it and, as a result, its leading edge is considerably stiffer than its trailing edge. Since the leading edge is stiff it is not easily deflected, and thus a good seal is formed between the gripping head and the plate. However, since the trailing edge is relatively flexible it will give if the bottom of the plate being carried by it strikes the remaining plates in the stack, and thereby prevent the plate from easily becoming dislodged from the gripping head. The bellows is sufficiently stiff that it remains in an expanded position at the vacuum levels which are created when air is being drawn through it, but collapses when the gripping head contacts a plate and a higher vacuum level is achieved. Thus, once a plate is grasped by a gripping head the bellows collapses and the plate is pulled away from the stack.

In addition, a roller extends between the carrier plates in front of each gripping head. The roller extends outwardly from the periphery of the gripping head and thus moves the stack of plates away from the gripping head as the gripping head approaches the stack. This not only ensures that the leading edge of the gripping head does not interfere with the stack but also creates a small gap between the stack and the gripping head when they become aligned. The vacuum then pulls the forwardmost plate across this small gap thereby adding to the separation caused by the collapsing of the bellows.

Vacuum airflow is provided at the passageways in the mounting blocks through openings which are located in one of the carrier plates, with one opening being aligned with each of the mounting blocks. A first sector plate, which is journaled on the carrier axle but does not rotate with it, has an annular slot extending through it which overlies the openings in the carrier plate when they are radially aligned. A second sector plate, which overlies the first sector plate and is attached to it, has a hole extending through it which opens into the slot in the first sector plate. Finally, a tube, which is connected to a vacuum source, fits into the hole in the second sector plate. Thus, when each opening in the carrier plate first passes over the slot in the first sector plate, vacuum flow is initiated to the gripping head associated with that opening, and when it passes away from the slot vacuum flow is terminated. The slots are located such that the former occurs when the gripping head is aligned with the stack of plates and the latter occurs when the gripping head is at the location where the plates are to be released.

Accordingly, it is a principal object of the present invention to provide a rotary plate feed apparatus which mechanically pulls the forwardmost plate away from the remaining plates in the stack.

It is a further object of the present invention to provide such an apparatus where this pulling action occurs automatically when the plates become affixed to the gripping head which holds them as they are being transported away from the stack.

It is a still further object of the present invention to provide such an apparatus in which low of vacuum to the gripping head is initiated and terminated without the use of solenoid valves.

It is a further object of the present invention to provide such an apparatus in which the timing of vacuum flow to the gripping head results directly from the rotation of the plate feed carrier.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view, partially broken away to show hidden detail, of a plate feed apparatus embodying the features of the present invention.

FIG. 2 is a plan view of the plate feed apparatus of FIG. 1.

FIGS. 3-5 are fragmentary side elevation views, at an enlarged scale, showing the operation of a portion of the apparatus of the present invention.

FIG. 6 is a plan view of the gripping head, which is a portion of the present invention.

FIG. 7 is a cross-sectional view taken along the line 7—7 in FIG. 2.

FIG. 8 is a cross-sectional view taken along the line 8—8 in FIG. 2.

DETAILED DESCRIPTION OF THE INVENTION

Figure 3:
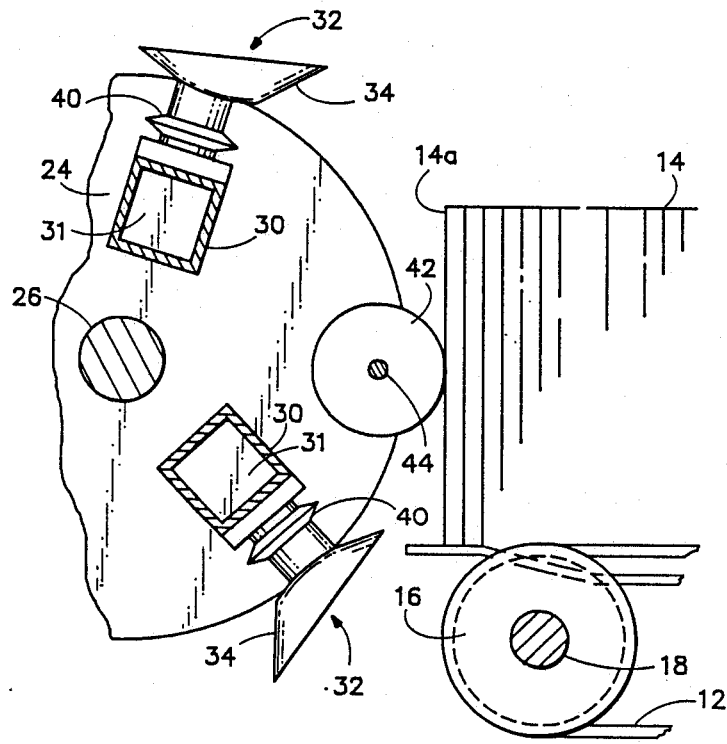
Figure 4:
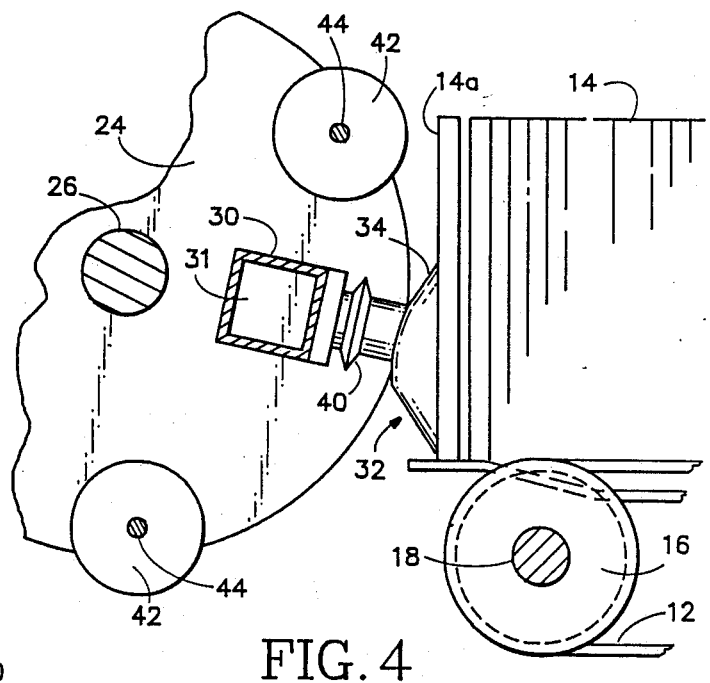

Referring to FIGS. 1 and 2 of the drawings, the feed apparatus of the present invention comprises a two-piece frame 10 which has a pair of spaced-apart conveyor belts 12 mounted on it. The conveyor belts 12 are arranged to support a stack of plates 14 that are oriented at a slight angle with respect to the vertical. Each conveyor belt extends between an opposed pair of pulleys 16 which are attached to the ends of conveyor shafts 18. The conveyor shafts in turn are journaled in flange bearings 20 which are attached to the frame pieces 10. This much of the apparatus is similar to that shown in U.S. Pat. No. 4,462,745.

Rotatably attached to the frame 10, downstream of the feed apparatus, is a rotary carrier 22. The carrier comprises a pair of spaced-apart cylindrical carrier pads 24 which are mounted on an axle 26. The axle in turn is journaled in bearings 28. Rectangular mounting blocks 30 extend between the carrier plates 24 at a predetermined number of equally spaced radial locations. The mounting blocks are hollow thereby forming passageways through them. In the embodiment illustrated there are three mounting blocks, however, there could be more or less depending on the particular application. In the embodiment illustrated the mounting blocks 30 are located circumferentially approximately midway between the peripheries and the centers of the carrier plates 24, however, this location depends upon the size of the gripping units 32 which will be used with the apparatus.

Referring now also to FIGS. 3-6, the gripping unit 32 of the present invention comprises a gripping head 34 which is dish-shaped and has a concave gripping surface 36 which becomes flush with the forwardmost plate 14a in the stack when the carrier rotates to where they are in alignment. As will be more fully explained later, air is drawn through a hole 37 in the gripping head to create a vacuum gripping force between the gripping face 36 and the forwardmost plate in the stack when they become aligned. Thus, the gripping head acts as a large suction cup and the plate becomes affixed to it. The gripping head is made from a firm but bendable synthetic rubber material and is designed so that its leading edge is stiffer than its trailing edge. This is accomplished in the embodiment illustrated by attaching the gripping head to the remainder of the gripping unit closer to its leading edge than to its trailing edge. As a result, the trailing edge portion of the gripping head is larger than the leading edge portion. The fact that the leading edge is less flexible ensures that a good seal is made between the gripping head and the forwardmost plate 14a when they come into contact. The greater flexibility of the trailing edge, on the other hand, ensures that the plate 14a will not easily be dislodged from the gripping head as the plate is being moved away from the stack 14.

The gripping head is attached to the remainder of the gripping unit at an obtuse angle. As can be seen in the drawings, the gripping head contacts the plate 14a near its lower edge and the angle of the gripping head accommodates flush contact at this location. Contact with the lower portion of the plate is important to ensure that the bottom edge of the plate 14a does not strike the remaining plates in the stack as it is rotated away from them. Located on the gripping surfaces 36 are a plurality of raised ribs 38, FIG. 6. The ribs 38 prevent bending of the plate being carried by the gripping head due to the suction force which is created between them.

Each gripping head 34 is attached to its associated mounting block 30 through a hollow bellows 40. The bellows is coaxially aligned with the hole 37 in the gripping head and opens into the passageway 31 so that vacuum air passes through it. The bellows is designed so that it remains in its expanded position, FIGS. 3-5, when the vacuum air is freely flowing through it, but collapses to pull the gripping head toward the carrier when a greater level of vacuum is established upon contact of the gripping surface 36 and the plate 14a. When this occurs the forwardmost plate is pulled away from the remaining plates in the stack, and will not strike the remaining plates in the stack as it is rotated away from them.

To further ensure that the lower edge of the plate being removed does not strike the remaining plates in the stack, stack compressing rollers 42 extend between the carrier plates 24 immediately ahead of each gripping head 32. The rollers 42 are journaled on shafts 44 which are attached to the carrier plates, and the shafts are arranged such that the rollers extend out beyond the periphery of the carrier plates. Immediately before each gripping head 32 comes into alignment with the stack a roller contacts the stack and moves it back on the conveyor belts 12, FIG. 3. Then, as the gripping head becomes aligned with the plate the roller pulls free from the top edge of the plate. The vacuum air then pulls the plate away from the stack into contact with the gripping head, FIG. 4, thereby creating a slight gap between the forwardmost plate 14a and the rest of the stack even before the bellows collapses.

Figure 9:
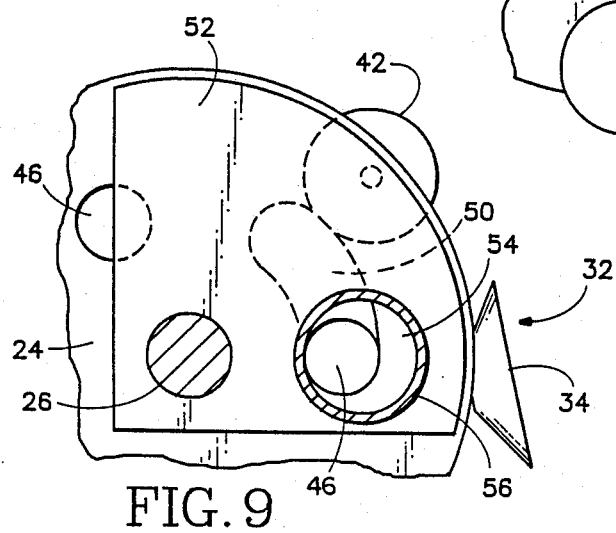
FIG. 9 is a cross-sectional view taken along the line 9—9 in FIG. 2.

The system which provides the suction air to the gripping heads, as well as initiating and terminating the flow of suction air, is best seen in FIGS. 7, 8 and 9. Referring first to FIG. 7, one of the carrier plates 24 has a plurality of openings 46 passing through it, one of which is coaxially aligned with each mounting block 30 and thus opens into the associated passageway 31. Referring now to FIG. 8, journaled on the axle 26, alongside of the carrier plate 24 with the openings 46 in it, is a first sector plate 48 which has a slightly smaller diameter and is somewhat thicker than the carrier plates. Unlike the carrier plates, however, the first sector plate 46 is only one-quarter section. Passing through the first sector plate 48 is a slot 50 having a width equal to the diameter of the openings 46 in the carrier plate. The center of the slot 50 is at the same radius as the openings 46.

A second sector plate 52, FIG. 9, having the same shape as the first sector plate 48 overlies it, and is attached to it by means such as screws (not shown). The second sector plate also is journaled on the axle 26 and it has a hole 54 passing through it which opens into the slot 50 of the first sector plate. A vacuum supply tube 56, which fits into the hole 54, extends to a conventional vacuum source (not shown). Since the two sector plates are attached to one another and are journaled on the axle 26 the supply tube prevents them from rotating when the carrier rotates. Thus, the slot 50 serves as a valve to initiate vacuum flow through each gripping head 32 as it becomes aligned with the forwardmost plate 14a, and to terminate flow when the carrier has rotated to a position where the plate will be deposited.

Located on the frame pieces 10, downstream from the carrier 22, are pulleys 58 which are aligned with the tops of the carrier plates 24. Endless belts 60 extend around the pulleys 58 and the carrier plates 24 to provide a positive plate removal system once the plates reach the top of the carrier. After a plate is removed from the carrier it is tranported on the belts 60 until it reaches the pulleys 58 whereupon it drops onto an outside conveyor system (not shown).

In operation the conveyor belts 12 constantly urge the stack of plates 14 toward the carrier 22, which is continuously rotating. As each roller 42 contacts the forwardmost plate 14a it urges the stack back so that the leading edge of the gripping head 32 associated with that roller clears the stack, FIG. 3. When the gripping head becomes aligned with the forwardmost plate 14a the opening 46 in the carrier plate 24 also becomes aligned with the slot 50 in the first sector plate. Thus, air from the vacuum source is drawn from the vacuum tube 56 through the hole 54, the slot 50, the opening 46, and the passageway 31 and into the vacuum head hole 37 to create a vacuum at the gripping surface. This vacuum then pulls the forwardmost plate free from the stack and into contact with the gripping head thereby leaving a small gap between the forwardmost plate 14a and the rest of the stack 14, FIG. 4. As the plate 14a comes into contact with the gripping head the vacuum increases causing the bellows 40 to collapse so that the gap between the forwardmost plate and the remainder of the stack increases, FIG. 5.

Since the forwardmost plate 14a is now attached to the gripping head 32 it rotates with the carrier 22 until the opening 46 in the carrier plate no longer is aligned with the slot 50. At this time the vacuum at the gripping head is terminated and the plate is released. In the embodiment illustrated this occurs when the gripping head is at the top of the carrier and the belts 60 support the plate and transport it away from the apparatus. Shortly thereafter the next roller 42 and gripping head 32 approaches the stack and the process is repeated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:
1. A vacuum supply system for a plate feed apparatus having a plurality of gripping heads with gripping surfaces for engaging a plate, comprising:
  (a) a pair of spaced-apart carrier plates;
  (b) axle means for rotating said carrier plates as a unit about a central axis;
  (c) a plurality of mounting blocks, one associated with each of said gripping heads, spanning between said carrier plates intermediate their centers and their peripheries, said mounting blocks having passageways defined therein which are fluidly interconnected with the gripping surface of the gripping head which is associated with said mounting block;
  (d) means for attaching one of said gripping heads centrally on each of said mounting blocks;
  (e) one of said carrier plates having a plurality of openings passing therethrough with one of said openings being aligned with each of said passageways;
  (f) a first sector plate journaled on said axle means but not rotatable therewith, said first sector plate having an annular slot passing therethrough which has a width approximately equal to the diameter of said opening and is centered on the same radius, relative to said axle means, that said openings are centered on; and
  (g) means for connecting said slot to a vacuum source.

2. The apparatus of claim 1 wherein said means for connecting said slot to a vacuum source comprises:
  (a) a second sector plate which overlies said first sector plate;
  (b) said second sector plate having a hole defined therein which opens into said slot; and
  (c) a vacuum pipe which fits into said hole.

3. The apparatus of claim 2 wherein said second sector plate is attached to said first sector plate and said vacuum pipe prevents said first and second sector plates from rotating with said carrier plates.

4. A feed apparatus for sequentially removing single plates from a stack of plates comprising:
  (a) a plurality of gripping heads having concave gripping surfaces;
  (b) means for placing the gripping surfaces of said gripping heads sequentially into flush contact with the forwardmost plate in the stack of plates;
  (c) vacuum means associated with each of said gripping heads for establishing a gripping force between said gripping head and said forwardmost plate when said gripping head is in flush contact therewith;
  (d) a bellows associated with each said gripping head;
  (e) said bellows being collapsible so that the associated gripping head moves away from said stack when said gripping force is established between said gripping head and said forwardmost plate;
  (f) wherein said gripping heads are mounted on a rotary carrier and each said gripping head has a leading edge which approaches said forwardmost plate when said carrier is rotated, said carrier including:
    (i) a pair of spaced-apart carrier plates;
    (ii) axle means for rotating said carrier plates as a unit about a central axis;
    (iii) a plurality of mounting blocks, one associated with each of said gripping heads, spanning between said carrier plates intermediate their centers and their peripheries, said mounting blocks having passageways defined therein which are fluidly interconnected with the gripping surface of the gripping head which is associated with said mounting block;

(iv) means for attaching one of said gripping heads centrally on each of said mounting blocks;

(v) one of said carrier plates having a plurality of openings passing therethrough with one of said openings being aligned with each of said passageways;

(vi) a first sector plate journaled on said axle means but not rotatable therewith, said first sector plate having an annular slot passing therethrough which has a width approximately equal to the diameter of said opening and is centered on the same radius, relative to said axle means, that said openings are centered on; and (vii) means for connecting said slot to a vacuum source.

5. The apparatus of claim 4 wherein said means for connecting said slot to a vacuum source comprises:

(a) a second sector plate which overlies said first sector plate;

(b) said second sector plate having a hole defined therein which opens into said slot; and (c) a vacuum pipe which fits into said hole.

6. The apparatus of claim 5 wherein said second sector plate is attached to said first sector plate and said vacuum pipe prevents said first and second sector plates from rotating with said carrier plates.

* * * * *

UNITED STATES PATENT AND TRADEMARK OFFICE
CERTIFICATE OF CORRECTION

PATENT NO. : 4,822,234

DATED : April 18, 1989

INVENTOR(S) : Peter E. Johnson et al.

It is certified that error appears in the above-identified patent and that said Letters Patent is hereby corrected as shown below:

Col. 2, line 62    Change "low" to --flow--.

Signed and Sealed this

Twenty-fifth Day of September, 1990

Attest:

HARRY F. MANBECK, JR.

*Attesting Officer*    *Commissioner of Patents and Trademarks*